Dec. 24, 1946. W. H. AVERY 2,412,940
SPECTROMETER PRISM MOUNTING
Filed Aug. 28, 1942 4 Sheets-Sheet 1

WILLIAM H. AVERY
INVENTOR.

BY
J. Vincent Martin
and
Ralph A. Browning
ATTORNEYS

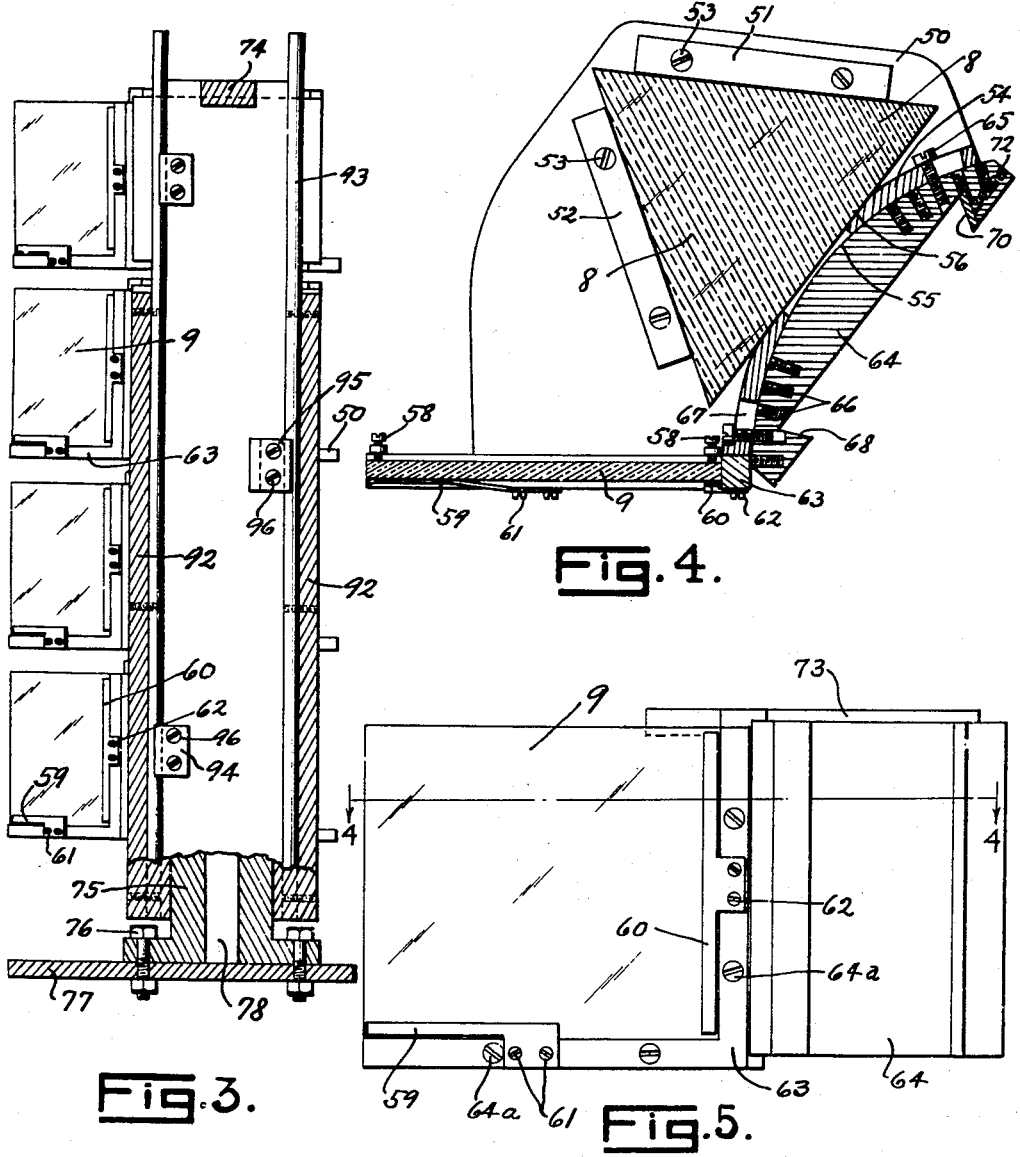
Dec. 24, 1946. W. H. AVERY 2,412,940
SPECTROMETER PRISM MOUNTING
Filed Aug. 28, 1942 4 Sheets-Sheet 2
WILLIAM H. AVERY.
INVENTOR.

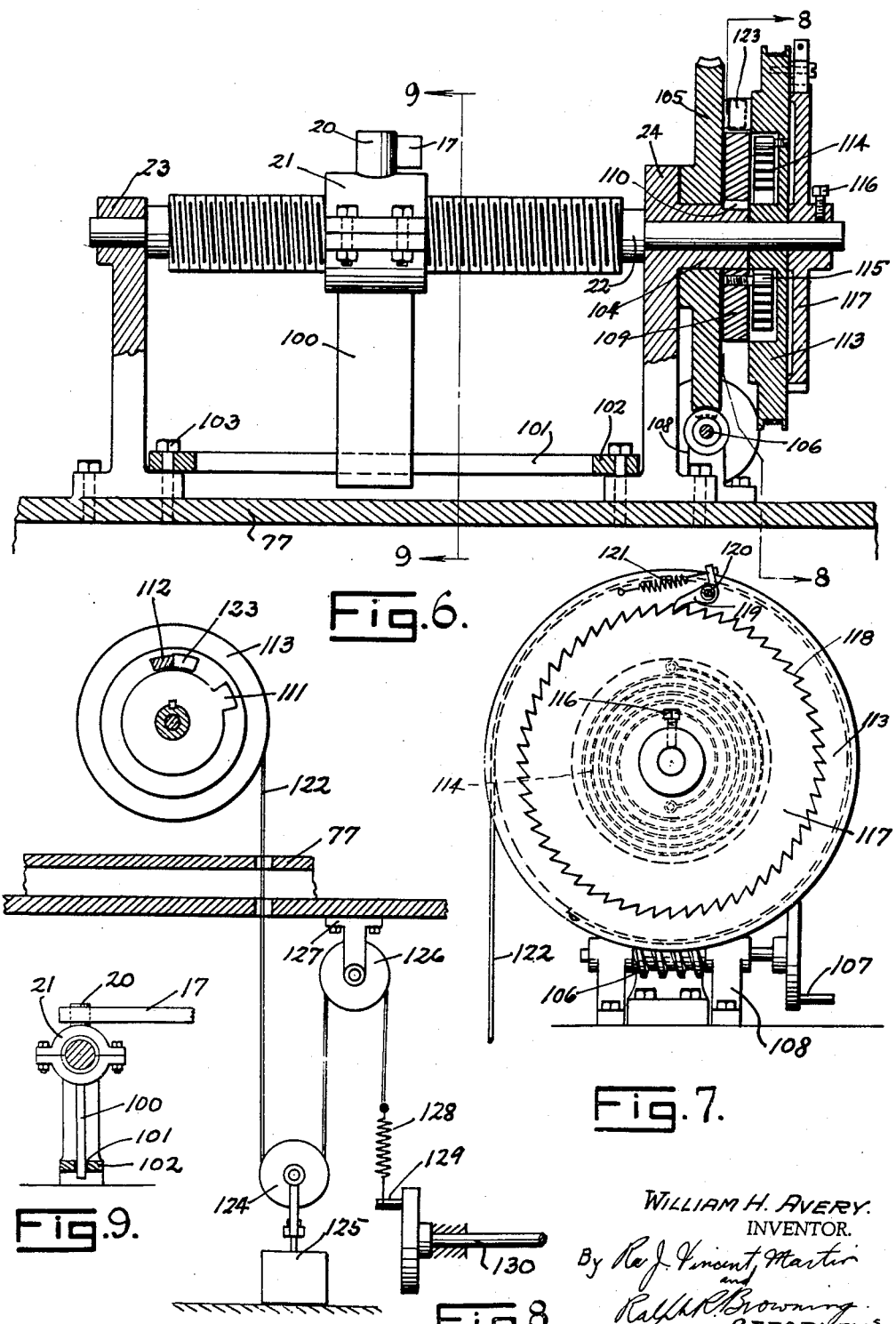

Dec. 24, 1946.     W. H. AVERY     2,412,940
SPECTROMETER PRISM MOUNTING
Filed Aug. 28, 1942     4 Sheets-Sheet 4
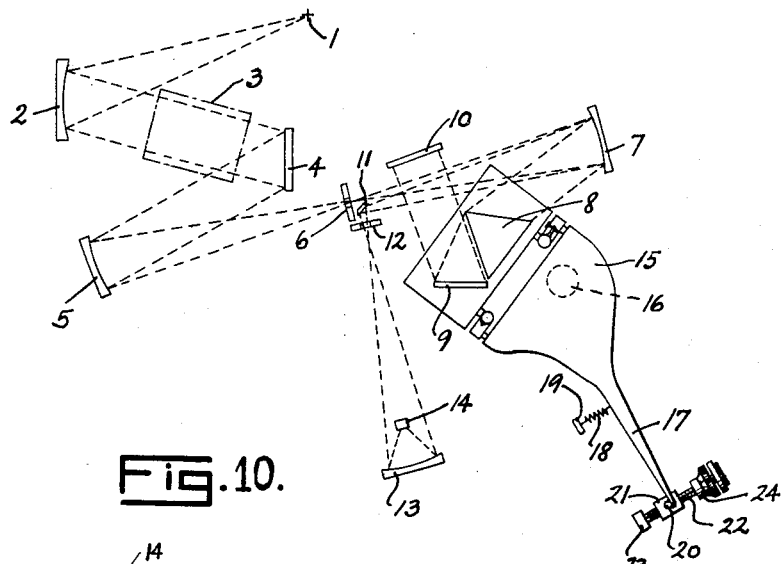
Fig. 10.
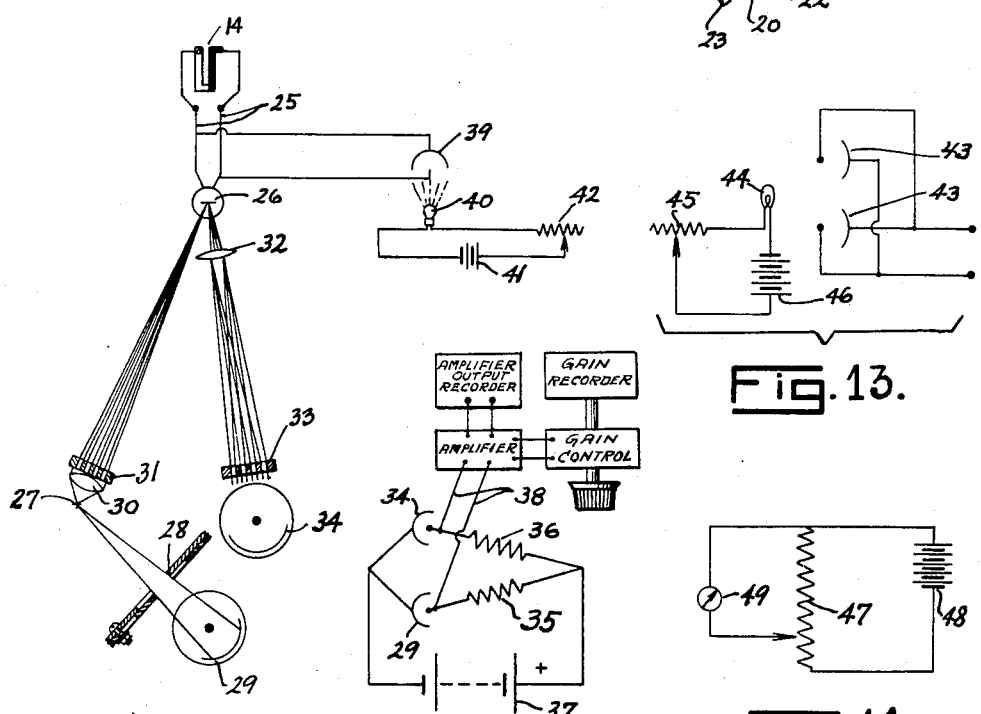
Fig. 11.    Fig. 12.    Fig. 13.    Fig. 14.
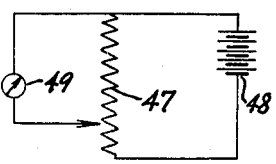
WILLIAM H. AVERY.
INVENTOR.
BY
ATTORNEYS Patented Dec. 24, 1946

2,412,940

UNITED STATES PATENT OFFICE 2,412,940

SPECTROMETER PRISM MOUNTING

William H. Avery, Houston, Tex.

Application August 28, 1942, Serial No. 456,528

3 Claims. (Cl. 88—1)

This invention relates to a spectrometer and especially to a spectrometer for use with so-called infra-red light. It has for its general object the provision of such a device which will be both accurate and simple in operation.

More specifically it is an object of this invention to provide an improved means for mounting and selectively positioning a plurality of prisms in such a spectrometer so that the same may be used interchangeably and selectively in the use of the spectrometer.

Another object is to provide an improved means for manipulating the prism of a spectrometer during the making of a test therewith.

Another object is to provide such a manipulating means which is adjustable as to the magnitude of the steps of movement of the prism during the manipulation thereof.

Other objects and advantages of this invention will become apparent from the following description taken in connection with the accompanying drawings wherein is set forth by way of illustration one embodiment of the invention.

In the drawings:

Fig. 3 is a vertical cross section taken along the line 3—3 of Fig. 1.

Fig. 4 is a horizontal cross section looking downwardly and taken along the line 4—4 of Fig. 5.

Fig. 5 shows a side elevation of one of the prisms illustrated in Figs. 1, 2 and 3 showing the means of holding and mounting the same, together with the mirror carried on the same mounting.

Fig. 6 is an enlarged longitudinal vertical cross section through the gear mechanism forming part of the prism manipulating structure.

Fig. 7 is an end view of the same mechanism taken from the right-hand end of the mechanism as shown in Fig. 6.

Fig. 8 is a fragmentary view taken partly along the line 8—8 of Fig. 6 and showing one means of connecting the gear mechanism of Fig. 6 with a power shaft for actuating the same.

Fig. 9 is a transverse vertical cross section taken along the line 9—9 of Fig. 6.

Fig. 10 is a schematic diagram illustrating the parts of the spectrometer in their relation to each other, together with the light path through the spectrometer.

Fig. 11 is a schematic illustration of a portion of the means for detecting variations in the galvanometer reading device forming a portion of the indicator for the spectrometer and showing a means for adjusting the zero position of the galvanometer.

Fig. 12 shows an electrical diagram depicting the connections between the photoelectric cells amplifying the galvanometer reading, which cells are illustrated in Fig. 11.

Fig. 13 shows an electrical diagram for a gain control to be used in regulating the amplification of the readings of the galvanometer forming a part of the reading device for the spectrometer.

Fig. 14 shows an electrical diagram of a gain rceorder for recording variations in the gain control shown in Fig. 13.

Figure 1:
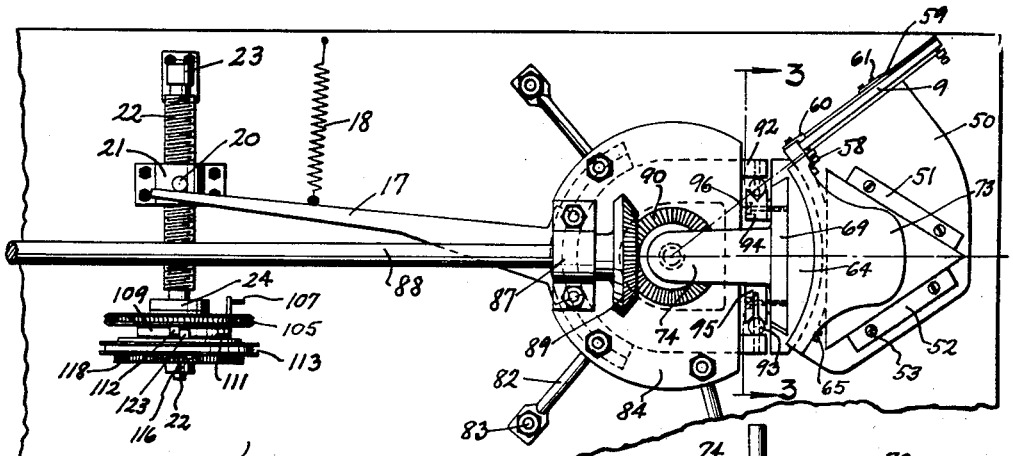
Fig. 1 is a fragmentary top plan view of the prism mounting and manipulating mechanism forming a part of the spectrometer of this invention.

Referring first to Fig. 10 of the drawings, the numeral 1 indicates the light source for the spectrometer. The light from this light source falls upon a collimating parabolized mirror 2 which directs the light along parallel lines through the absorption cell 3. After passing through the absorption cell this light is reflected by a plane mirror 4 onto a focusing parabolized mirror 5 which focuses the light on a slit 6. After passing through the slit 6 the light rays again diverge and fall upon another parabolized collimating mirror 7 which directs the light along parallel lines on to the prism 8. Upon passing through the prism 8 the light rays fall upon a plane mirror 9 mounted upon the same mounting as the prism 8 and are directed by this mirror onto a plane mirror 10. The mirror 10 is so arranged at right angles to the light path that it reflects the light back onto the mirror 9 which in turn reflects it back through the prism 8 and on the mirror 7. However, the angle of reflection from the mirror 7 is slightly different from the angle at which the light originally encountered the mirror 7, so that this light is transmitted along a slightly different but converging path to impinge upon the plane mirror 11 which is just to one side of the slit 6. This plane mirror 11 reflects the light in a lateral direction through a slit 12 upon which it is focused. After passing through the slit 12 the light strikes an elliptical mirror 13, one of the focal points of which is the converging point of the light as it passes through the slit 12. Light from the elliptical mirror 13 is focused upon the thermocouple 14, and by means which will presently be described the intensity of light falling on this thermocouple is measured.

The prism 8 illustrated in Fig. 10 is one of several as will presently be described, and all of these are carried upon a rotatable support 15 adapted to rotate about an axis 16. This support has an arm 17 extending laterally in one direction therefrom and a spring 18 anchored at 19 is provided which tends at all times to swing the arm 17 in one direction about its axis 16. Holding the arm against thus swinging under the influence of the spring 18, is a stop 20 mounted on a nut 21 adapted to travel back and forth on a screw shaft 22. The screw shaft is mounted in bearings 23 and 24 and is provided with suitable gears for intermittently rotating the shaft 22 and advancing the nut 21 in one direction so as to provide a step-by-step rotation of the support member 15 and hence of the prism 8 and mirror 9 about the axis 16. The gear mechanism just referred to will presently be described more in detail.

Referring now to Fig. 11, the thermocouple 14 is connected through electrical leads 25 to a galvanometer 26. In order that this galvanometer might be accurately read, a light source 27 is provided adapted to pass light through an adjustable opening in a screen 28 to impinge upon one photocell 29. In another direction, light from the same source 27 is adapted to pass through a lens 30 and a grid 31 to be focused upon the mirror of the galvanometer 26. Upon being reflected from this mirror the light passes through a focusing lens 32 and is focused upon a grid 33 which is identical with the grid 31 in its pattern and so arranged that when the galvanometer is in zero position light passing through the openings in the grid 31 will be focused upon the corresponding openings in the grid 33 and passing therethrough will strike the photocell 34. Photocells 29 and 34 are preferably identical and the opening in the screen 28 is initially adjusted so that when the galvanometer reading is zero the light falling upon the two photocells 29 and 34 will be the same. This is determined by means of the electrical hookup shown in Fig. 12. That is, the cathodes of the photocells 29 and 34 are connected to each other and the anodes are each connected to a resistance 35 or 36 as the case may be. The opposite terminals of these resistances are connected to each other and that point of connection is electrically connected to the positive terminal of a battery 37. The negative terminal of this battery is connected to the cathodes of the photocells. Leads are taken from the respective anodes of these photocells as shown at 38 and these are connected to an amplifier of any suitable well known type the output of which may be governed by a gain control. With the light falling on the photocells 29 and 34 equally, if the light falling on the photocell 34 should be changed as would be caused by the rotation of the galvanometer mirror 26 and hence by the interception of a part of the light focused upon the grid 33, the potentials of the anodes of these photocells would become unequal. This would cause the amplifier output to change and would indicate the swinging of the galvanometer mirror.

In order that the galvanometer might be adjusted accurately to its zero position, there is connected in parallel with the galvanometer a photocell 39 adapted to receive light from a light source 40. This light source 40 is energized from a battery 41 or any other suitable electrical source and the light energy of the source 40 is governed by a rheostat 42 or other suitable device for controlling the light intensity. It will be seen that by adjusting the rheostat 42 and hence varying the amount of light falling on the photocell 39, the position of the galvanometer mirror may be changed by very small increments until this mirror stands at exactly its zero point.

For the purpose of controlling the gain of the amplifier above referred to the hookup illustrated in Fig. 13 is employed. This hookup involves the use of two photocells 43 which are identical and which are opposed to each other as illustrated and connected to the amplifier to control the gain thereof. The photocells are positioned to receive light from the light source 44, the intensity of which is controlled by means of a rheostat 45 that controls the supply of energy to the light from the battery 46. By adjustment of this light source 44 by means of the rheostat 45 the resistance offered by the photocells 43, which are shunted across the input of the amplifier, may be varied through a very great range, and very accurate gain control can be thereby obtained.

For a purpose presently to be set forth it is desirable that a record be made of the variations in gain control. To this end, there is mounted on the same shaft with the rheostat 45 a second rheostat 47 which is not electrically connected with the first. This second rheostat is connected as illustrated in Fig. 14 and serves to control the voltage supply from the battery 48 to the recording instrument 49 where a record of the variation of the rheostat 47 is made against time. It will be understood also that the output from the amplifier that is controlled by the galvanometer 26 is recorded against time.

Referring back now more in detail to the structure forming the support and manipulating means for the prisms, it will be seen on reference to Figs. 4 and 5 that each of the prisms 8 is mounted on a platform or plate 50 where it is held properly positioned by means of bars 51 and 52 secured by means of screws 53 to the plate 50. This plate 50 has a part extending upwardly at right angles thereto as shown at 54, this part being formed along an arc with the center of rotation of the prism support as its center. This curved upstanding part 54 is provided adjacent its center with an opening 55 and with flattened portions 56 against which the third side of the prism 8 is adapted to bear. Also carried on the plate member 50 is the plane mirror 9, the position of which may be adjusted by means of set screws 58, and which is held against said set screws by means of springs 59 and 60 respectively. The springs 59 and 60 are secured to the mirror support by means of screws 61 and 62 respectively. The part 63 on which this mirror is carried is L-shape as illustrated in Fig. 5 and is secured to one end portion of the plate 50 and upstanding part 54 by means of screws 64a.

The plate 50 and upstanding part 54 are secured to an individual adjustable support block 64 by means of screws 65. The screws 65 may be engaged selectively with numerous tapped openings 66 in the block 64 so as to make it possible to adjust the prism 8 to various angles with respect to said block. This adjustment is further facilitated by means of the slots 67 in the upstanding part 54, through which slots the screws 65 are adapted to pass.

Figure 2:
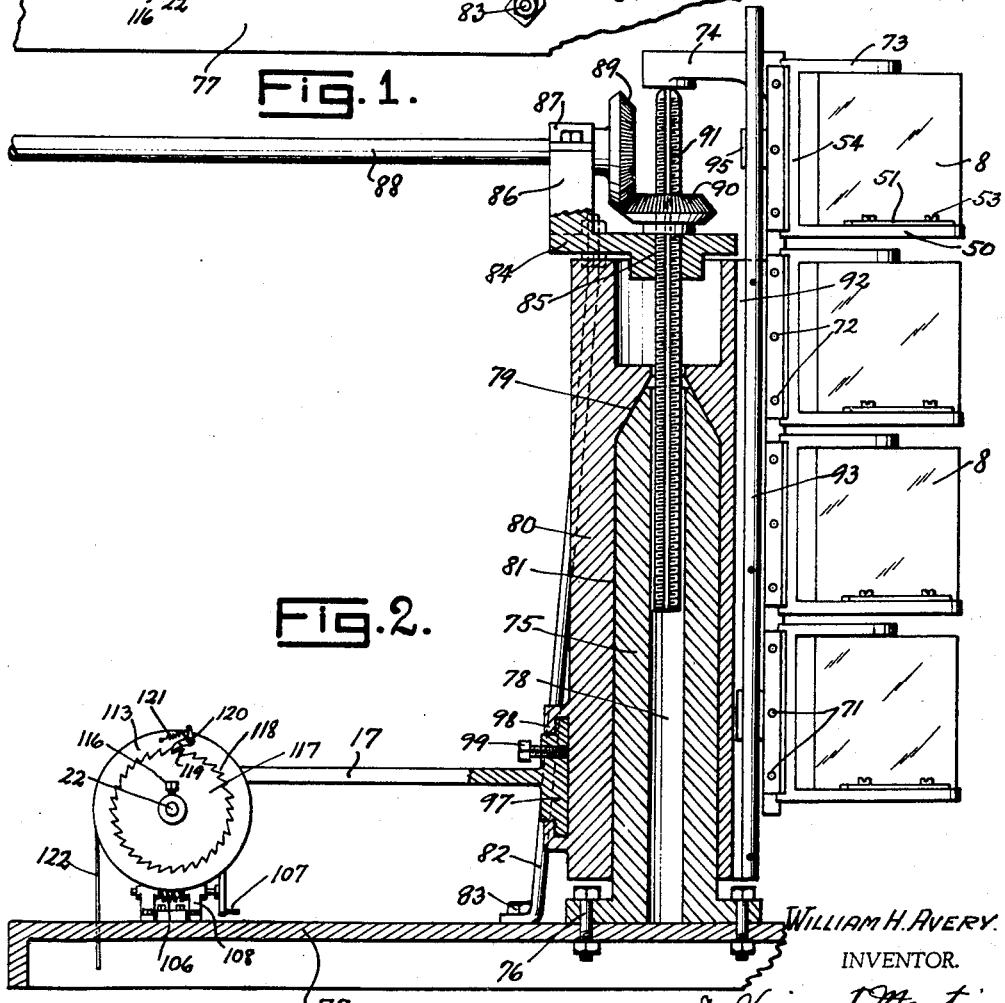
Fig. 2 is a view partly in vertical cross section and partly in side elevation showing the mechanism illustrated in Fig. 1.

Each of the blocks 64 has a dovetailed groove 68 in its rear surface which groove is adapted to slidingly engage a dovetailed shaped slide 69, this slide being long enough to accommodate a number of the blocks 64, with four such blocks being illustrated on the same slide in Figs. 2 and 3. The blocks 64 are located in adjusted position on the slide 69 by means of a locking shoe or plate 70 placed inside and at one edge of the groove 68, this plate being forced inwardly to engage the slide 69 by means of set screws 71 engaged in tapped openings 72 in the edges of the blocks 64. Thus the blocks 64 with their prisms and mirrors 8 and 9 carried thereon may be adjusted upwardly or downwardly with respect to the slide 69 and then clamped on said slide in proper position. A number of such prisms may be mounted on the same slide in the manner just described, the prisms being preferably made of different materials such as for example quartz, fluorite, rocksalt, or potassium bromide.

It is noted also by reference to Figs. 2 and 5 that the support plate 50 and the curved upstanding part 54 have integral with them an upper plate portion 73 which is spaced from the plate 50 just a sufficient distance to receive the prism 8. The slide 69 also has at its upper end an arm 74 extending rearwardly and presenting a downwardly facing bearing surface overlying the axis about which the curvature of the member 54 is formed, which is the axis about which the entire device is intended to rotate as will presently be explained.

For the purpose of rotatably supporting the prism holder just described, a vertical shaft 75 is anchored by means of bolts 76 or the like to the base plate 77. This shaft is of cylindrical external formation and has a hollow bore 78 therethrough. At its upper end the shaft is tapered to provide a frusto-conical zone 79, the outer surfaces of which face outwardly and upwardly.

Telescoped over the shaft 75 is a support sleeve 80 having a bore therein which is cylindrical throughout the major portion of its length as shown at 81 to receive the cylindrical portion of the shaft 75 and which converges adjacent its upper end on the same angle as the taper on the upper end of the shaft so as to form with the shaft end a tapered thrust bearing. The sleeve 80 is thus supported for rotation and against axial movement in a downward direction.

Supported above the upper end of the sleeve 80 on bars 82 extending from and secured to the base at 83 is a platform 84 having an opening 85 therethrough in alignment with the opening 78 in the shaft 75, and having an upstanding bearing support 86 adjacent one edge. The bearing support, taken with the bearing cap 87 forms a bearing at the upper end of the bearing support for the purpose of rotatably supporting a horizontal shaft 88. This horizontal shaft has a bevel gear 89 on its end overlying the platform 84, such bevel gear being intended to mesh with a complementary bevel gear 90 supported on the platform 84. The bevel gear 90 is in the form of a nut threadedly engaging the threaded shaft or screw 91, the lower end of which is adapted to project into the hollow portion 78 of the shaft 75 and the upper end of which is formed with a bearing surface adapted to bear against the bearing surface on the lower side of the arm 74.

On one side of the sleeve 80 the same is provided with laterally projecting lugs 92 to which are secured upright parallel bars 93 forming a guide for the slide 69. The slide 69 in turn is provided with bearing blocks 94 and 95 held in place by means of cap screws 96 against the slide 69. These bearing blocks have V-shaped openings in their remote surfaces, such openings being for the purpose of slidingly engaging the bars 93. The block 95 in engagement with one of the bars 93 may be split from its V-shaped opening so that when the screws 96 securing it in place are tightened the blocks 94 and 95 will both more closely engage the bars 93. Thus it is possible to mount the slide 69 on the rotatable sleeve 80 so that it will slide reasonably freely yet so there will be for all practical purposes no "play" between the parts. It is further to be noted that by virtue of the long cylindrical bearing between the sleeve 80 and the shaft 75 the sleeve 80 will not be permitted any substantial lateral movement and by virtue of the tapered thrust bearing it will be held properly centered at all times.

For the purpose of rotating the sleeve 80 and the prisms mounted thereon, the arm 17 is secured to the sleeve 80 by means of a circumferentially adjustable shoe 97. This shoe 97 fits under retaining bosses 98 on the sleeve 80 and is locked in any particular adjustment by means of a set screw 99. The arm 17, as heretofore explained, is continually urged in one direction about the axis of the shaft 75 by means of a spring 18. This holds the end of the arm 17 at all times in contact with the pin 20 on the nut 21 which is in turn carried on the screw shaft 22.

As will be seen in Figs. 6 and 9, the nut 21 is split to enable it to be put in place and it has a downwardly extending projection 100 engageable in a slot 101 in a bar 102 so as to keep the nut from rotating with the shaft 22. The bar 102 is anchored by means of bolts 103 or the like to the base 77 at the same point at which the bearing supports for the bearings 23 and 24 are anchored.

The bearing support 24 has a projecting boss 104 on its outer surface, the end of the shaft passing through this boss entirely and extending beyond the boss, and the boss itself serving as a bearing for a worm wheel 105. The worm wheel 105 may, if desired, be driven by means of a worm 106 actuated by a hand crank 107. The worm and hand crank are supported in any suitable bearings 108 on the base 77.

Also mounted on the boss 104 but not rotatable thereon is a disk 109 keyed to the boss by means of a key 110. This disk has a radially projecting stop 111 on one side thereof and the worm wheel 105 has a laterally projecting stop 112 which is in circumferential alignment with the stop 111 on the disk 109. Outwardly of the disk 109 there is rotatably mounted on the shaft 22 a driving pulley wheel 113 having a hollowed-out portion with a flat coil spring 114 anchored at one end therein. This hollowed-out portion faces toward the disk 109 and the opposite end of the spring 114 is anchored at 115 to a pin mounted on the disk 109. This spring 114 is wound in such direction that when the driving pulley 113 is rotating to the left as seen in Fig. 7 or to the right as seen in Fig. 8 it will tend to wind the spring tighter and when released, the spring will tend to rotate the pulley 113 in the opposite direction to the right in Fig. 7 or to the left in Fig. 8.

Secured to the outer end of the shaft 22 by means of a set screw 116 or the like is a ratchet wheel 117 having ratchet teeth 118 on its outer periphery. These ratchet teeth are adapted to be engaged by a pawl 119 pivoted at 120 on the pulley 113 and held in engagement with the ratchet teeth 118 by means of a spring 121. The pulley wheel 113 is also provided with a laterally projecting stop 123 located between the stop 111 on the disk 109 and the stop 112 on the worm wheel 105, but in circumferential alignment with those two stops.

In operation, it will be seen that when a downward pull is exerted upon the tape or belt 122 that partly surrounds and is secured to the periphery of the wheel 113, this wheel will be rotated to the right as seen in Fig. 8 until the stop 123 on the pulley wheel comes in contact with the stop 111 on the disk 109. During this time also the pawl 119 in engagement with one of the teeth 118 will cause the simultaneous rotation of the ratchet wheel 117 and the shaft 22 and the longitudinal travel of the nut 21 which will produce a slight rotation of the sleeve 80 and the prisms carried thereby. Also during this time the spring 114 will have been wound somewhat tighter and when the tape or belt 122 is subsequently released, this spring will cause the reverse rotation of the pulley wheel 113 until the stop 123 carried by such wheel comes into engagement with the stop 112 on the worm wheel 105. During this backward rotation, of course, the pawl 119 will merely slide over the ratchet teeth 118 and the ratchet wheel 117 and shaft 22 will not be rotated.

It will be seen that the position of the stop 112 may be adjusted by means of rotation of the crank 107 thereby rotating the worm wheel 105, and further that the position of this stop 112 will determine the number of ratchet teeth 118 over which the pawl 119 will move during the reverse rotation of the pulley wheel 113. If therefore the worm wheel 105 is adjusted to permit a greater reverse rotation of the pulley wheel 113, the pawl will pass over more teeth on the reverse rotation, and on its forward rotation will rotate the ratchet wheel and shaft 22 further. It will thus be seen that by the hand wheel 107 the amount of rotation imparted to the prism holders by each pull upon the belt or tape 122 may be increased or decreased as desired.

For the purpose of exerting an intermittent pull on the belt or tape 122, this tape is passed downwardly through the base 77 and under a pulley 124 attached to a weight 125, thence upwardly and through a pulley 126 anchored at 127 to the base 77. From this point it passes downwardly and is secured through the medium of a spring 128 to the crank arm 129 on the power shaft 130. Thus it will be seen that as the power shaft 130 is rotated by any suitable means the belt or tape 122 will be alternately pulled and released. The shock of these pulls and releases will be absorbed to a great extent by the spring 128 so as not to disturb the delicate adjustment of the mechanism. The weight 125 will definitely limit the maximum force which may be exerted on the mechanism through the belt or tape 122. This makes it possible for the mechanism to be adjusted so that the pawl 119 will pass over one tooth or a great many teeth according to the operator's desire without exerting undue tension upon the spring 128, the tape 122 or the mechanism taken as a whole. Thus, when the mechanism is adjusted so that the pawl only moves a short distance for each revolution of the crank, the additional amount of the throw of the crank which is necessarily present in order that the pawl may be caused to move over many teeth when the mechanism is so adjusted, will be taken up by the raising of the weight 125.

In actual operation, the light sources 1, 27, 40 and 44 will be energized and a null cell inserted in the position indicated by the numeral 3. The zero and total intensity are then adjusted by varying the zero position of the galvanometer through adjustment of the rheostat 42 and by varying the width of the opening in the screen 28 so that the intensity corresponds to zero and 100% or some convenient scale. The prism support is then started on its rotation by starting the rotation of the shaft 130. Thereupon this prism support will begin to rotate in steps depending in frequency upon the speed of rotation of the shaft 130 and in degree upon the adjustment of the crank 107.

The recorder which may be of any suitable type for recording the output of the amplifier is also started at the same time but the output of the amplifier is not allowed to vary. Instead, it is kept substantially constant for each position of the prism by means of adjusting the gain control rheostat 45. Thus as the prism support is rotated throughout its range the recorder recording the output of the amplifier will draw a straight horizontal line instead of a wavy line or a line varying in intensity during the progress of the test. However, the variations in the gain control are recorded by means of the recorder 49 because each time the rheostat 45 is moved to keep the output of the amplifier constant the rheostat 47 will likewise be moved and this will vary the reading of the recorder 49.

When the desired spectral region has been scanned with the null cell in place the spectrometer and the charts of the two recorders are reset to their positions at the beginning of the run and the null cell is replaced by the filled cell. The run is then repeated, the gain control being operated in this case so that the record on the recorder 49 is duplicated. In other words the operator would pay no attention to whether the output from the amplifier is kept constant but would vary his gain control so that the recorder 49 would trace the same pattern as previously. During this operation it will be seen that the output of the amplifier will for any given position of the prism indicate the percentage of transmission of the filled cell as compared with the transmission of the null cell, the latter value being regarded as 100%. Therefore, it is possible with a record made as just described to read directly from the record the percentage of transmission for any given prism position of the filled cell with respect to the null cell.

This is compared with what would have taken place without the use of the gain control. In that case the transmission of the null cell would have caused not a straight horizontal line but an uneven line because the output of the amplifier would have varied as the prism rotated. Then when the reading would have been taken with the filled cell, a line would have been drawn indicating the output of the amplifier for the filled cell. Then in order to obtain the percentage of transmission of the filled cell with respect to the null cell for any position of the prism, it would be necessary to measure the output of the amplifier at that point for the null cell and using that value as 100% calculate the percentage of transmission as indicated by the amplifier output for the filled cell.

The above described operation has been set forth for one prism. However, it will be appreciated that different prisms may be employed at the will of the operator. All that is necessary to change from one prism to another is to rotate the shaft 88 thereby raising or lowering the screw shaft 91 and the slide 69 which carries the prisms.

It is noted furthermore that by virtue of the arrangement illustrated and described, the entire device may be enclosed within a housing in which predetermined temperature and humidity conditions can be maintained, and the adjustments that have been referred to can be made from a remote point outside the housing through the medium of the shaft 88.

In view of the foregoing it will be seen also that a means has been provided which is capable of carrying out and accomplishing all of the objects and advantages sought by this invention.

Having described my invention, I claim:

1. In a spectrometer, a prism mounting comprising a stationary bearing shaft, a carrier sleeve rotatably mounted on said shaft, a longitudinally extending guide on one side of said sleeve, a slide mounted on said guide for longitudinal movement therealong, means for mounting a plurality of prisms along said slide at longitudinally spaced intervals, and means for adjusting said slide longitudinally with respect to said guide to selectively bring one or another of the prisms carried by said slide into operative position.

2. In a spectrometer, a prism mounting comprising a stationary bearing shaft, a carrier sleeve rotatably mounted on said shaft, a longitudinally extending guide on one side of said sleeve, a slide mounted on said guide for longitudinal movement therealong, means for mounting a plurality of prisms along said slide at longitudinally spaced intervals, said mounting means including means for rotatably adjusting said prisms individually with respect to said bearing shaft, and means for adjusting said slide longitudinally of said sleeve to selectively bring one or another of the prisms carried by said slide into operative position.

3. In a spectrometer, a prism mounting comprising a stationary bearing shaft, a carrier sleeve rotatably mounted on said shaft, a longitudinally extending guide on one side of said sleeve, a slide mounted on said guide for longitudinal movement therealong, means for mounting a plurality of prisms along said slide at spaced intervals, said mounting means including a prism holder for each prism, means for adjusting each prism holder angularly horizontally with respect to the circumference of said carrier sleeve, and means on each prism holder for adjustably mounting a mirror, and means for adjusting said slide longitudinally with respect to said sleeve to selectively bring one or another of the prisms carried by said slide into operative position.

WILLIAM H. AVERY.